United States Patent [19]
Iida et al.

[11] Patent Number: 6,166,504
[45] Date of Patent: Dec. 26, 2000

[54] CONTROL APPARATUS FOR ROBOT HAVING AN ARM MOVING WITHIN ALLOWABLE WORKING AREA

[75] Inventors: Shinji Iida, Nagoya; Koji Kamiya, Anjo, both of Japan

[73] Assignee: Denso Corporation, Kariya, Japan

[21] Appl. No.: 09/437,260

[22] Filed: Nov. 10, 1999

[51] Int. Cl.$^7$ .................................................. G05B 11/01
[52] U.S. Cl. ............... 318/560; 318/568.11; 318/568.12; 318/568.18; 318/568.21; 318/569; 501/19; 501/20
[58] Field of Search .......................... 318/568.11, 568.12, 318/568.18, 568.21, 569; 901/19, 20

[56] References Cited

U.S. PATENT DOCUMENTS

| 6,034,712 | 3/2000 | Iwasaki | 318/568.11 |
| 6,044,964 | 4/2000 | Krupa, Jr. et al. | 318/568.11 |

FOREIGN PATENT DOCUMENTS 7-314378  12/1995  Japan .

*Primary Examiner*—Karen Masih
*Attorney, Agent, or Firm*—Pillsbury Madison & Sutro LLP

[57] ABSTRACT

A robot that stops an arm within a limitation position of a predetermined working area when the arm is going to exceed the predetermined working area. A CPU of controller calculates a position and a speed of an arm at a next sampling time when a present sampling time comes. The CPU calculates an operation a mount which is a distance to be moved till the arm stops when the arm would be decelerated with a predetermined deceleration, and a position of the arm when the arm would operate by the operation amount after the position at the next sampling time. When a stop position as a result of the deceleration exceeds a predetermined limitation position, the CPU stops the arm with the predetermined deceleration. In this way, the CPU obtains the operation speed of the arm each time, and change a position to start to deceleration based on the operation speed, the arm can be stopped around the limitation position of the working area without fail.

10 Claims, 5 Drawing Sheets

CONTROL APPARATUS FOR ROBOT HAVING AN ARM MOVING WITHIN ALLOWABLE WORKING AREA

CROSS REFERENCE TO RELATED APPLICATION

This application is based upon Japanese Patent Application No. Hei. 10-364389 filed on Dec. 22, 1998, the contents of which are incorporated herein by reference.

BACKGROUND OF THE INVENTION

1. Field of the Invention

This invention relates to a control apparatus for a robot, and particularly to a control apparatus for a robot, which restrict an arm of the robot from exceeding a predetermined allowable working area.

2. Related Art

A multi-arm type industrial robot generally has plural arms (movable portions) jointed each other at plural joint portions. Each arm of the robot rotationally operates by receiving driving torque from a motor such as a servomotor as a driving unit via a transmission mechanism. A hand provided at a tip of the robot is operated as a result of combination of each arm operation in accordance with a program.

In such the industrial robot, particularly in the case where the tip of the robot is controlled by a linear interpolation so that the tip of the robot substantially linearly moves between two points, it is difficult at the time an operation program is developed to predict what locus each of the arms trances. Therefore, the arms may behave unexpected movements so that the arms may collide with peripheral equipment when the robot makes a test operation.

Therefore, the industrial robot generally restricts a working area in which each of the arms operates. In detail, a conventional industrial robot employs stoppers at limitation positions of the working area in which the arms are allowed to work (allowable working area) so that the arms do not exceed the stoppers. Furthermore, on an operation program viewpoint, a controller observes whether a position command value for the arm exceeds a normal working area, which exists within the allowable working area. When the controller detects that the position command value exceeds the normal working area, the controller applies brake to the arm to decelerate the arm with a predetermined deceleration so as to stop the arm.

However, in the conventional working area restriction system, the arm may collide the stopper without sufficiently deceleration if an interval between the stoppers and the normal working area is not enough.

SUMMARY OF THE INVENTION

This invention has been conceived in view of the background thus far described and its first object is to stop an arm within a limitation position of a predetermined working area when the arm is going to exceed the predetermined working area.

According to the present invention, position detecting means detects a position of an arm every a predetermined observation time, speed detecting means detects an operation speed of the arm every the predetermined observation time. After that, operation amount calculating means calculates an operation amount of the arm from a start timing of deceleration to a stop timing of the arm when the arm operating at the speed detected by the speed detecting means is decelerated with a predetermined deceleration. Judging means judges whether a stop position of the arm exceeds a predetermined working area when the arm moves by the operation amount from the position detected by the position detecting means. When the judging means judges that the stop position of the arm exceeds the predetermined working area, stop controlling means stops the arm with the predetermined deceleration.

In this way, the control apparatus obtains the operation speed of the arm every the predetermined observation time, and changes a position to start to deceleration based on the operation speed, the arm can be stopped within the limitation position of the working area. When the working area is set within an allowance working area, the arm can be stopped within the limitation position of the working area.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

DESCRIPTION OF THE PREFERRED EMBODIMENTS

A robot system of this embodiment will be explained with reference to the accompanying drawings.

Figure 1:
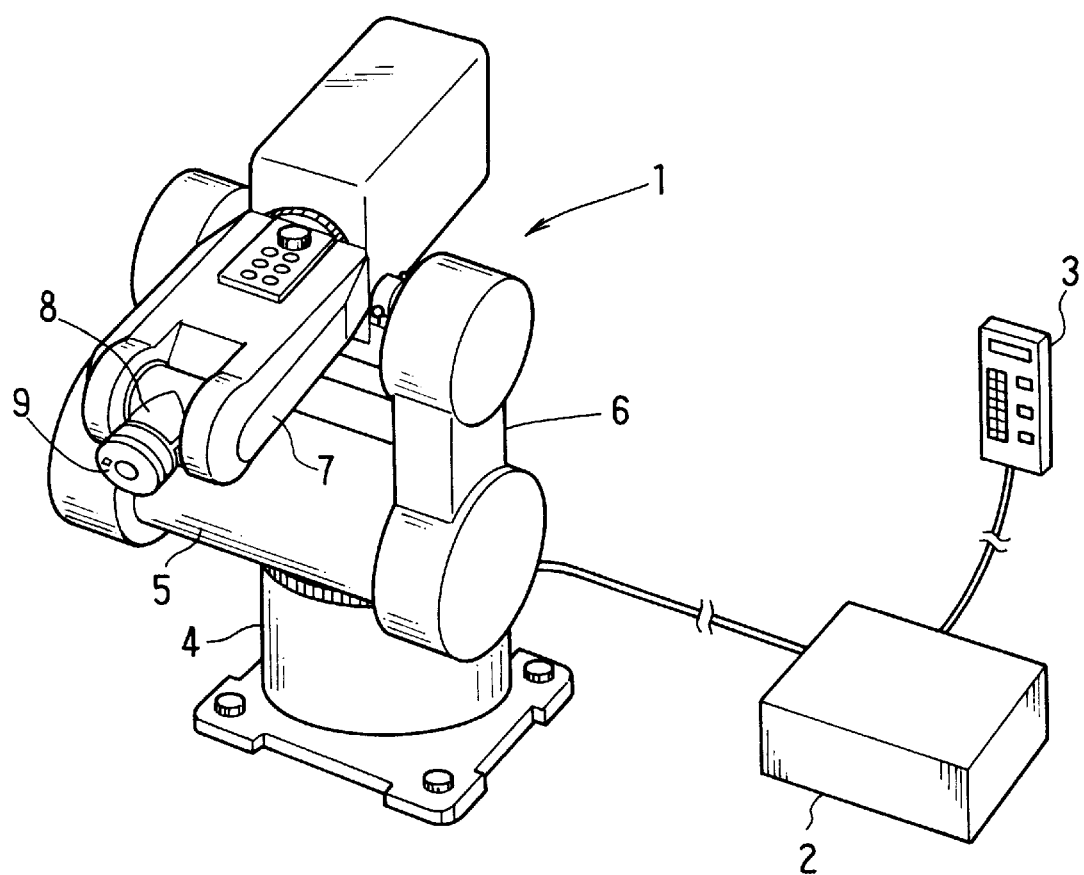
FIG. 1 is a perspective view of a whole robot system according to the present invention.

A robot system is provided with a robot main body 1, a controller 2 for controlling the robot main body 1, and a teaching pendant 3, as shown in FIG. 1.

In this embodiment, the robot main body 1 as a control target of the controller 2 is constructed as a perpendicular multi-arm type assembly robot. The robot main body 1 is provided with a base 4, a shoulder portion 5 horizontally rotatably provided to the base 4, a lower arm 6 vertically rotatably provided to the shoulder portion 5, an upper arm 7 vertically rotatably and torsionally rotatably provided to the lower arm 6, a wrist 8 vertically rotatably provided to the upper arm 7, and a flange 9 torsionally rotatably provided at a tip of the wrist 8. Furthermore, a not-shown hand for holding a work can be installed at the flange 9. Each arms 5–9 is jointed at joint portions, respectively, and is rotated by not-shown motors provided to each joint portions.

Here, a horizontal rotation operation of the shoulder portion 5, a vertical rotation operation of the lower arm 6, a vertical rotation operation of the upper arm 7, a vertical rotation operation of the wrist 8, and a rotation operation of the flange 9 are performed by rotation operation of each of the arms driven (rotated) by each of the motors 10 (see FIG.

2) such as a DC servomotor as a drive unit via not-shown transmission mechanisms.

Figure 2:
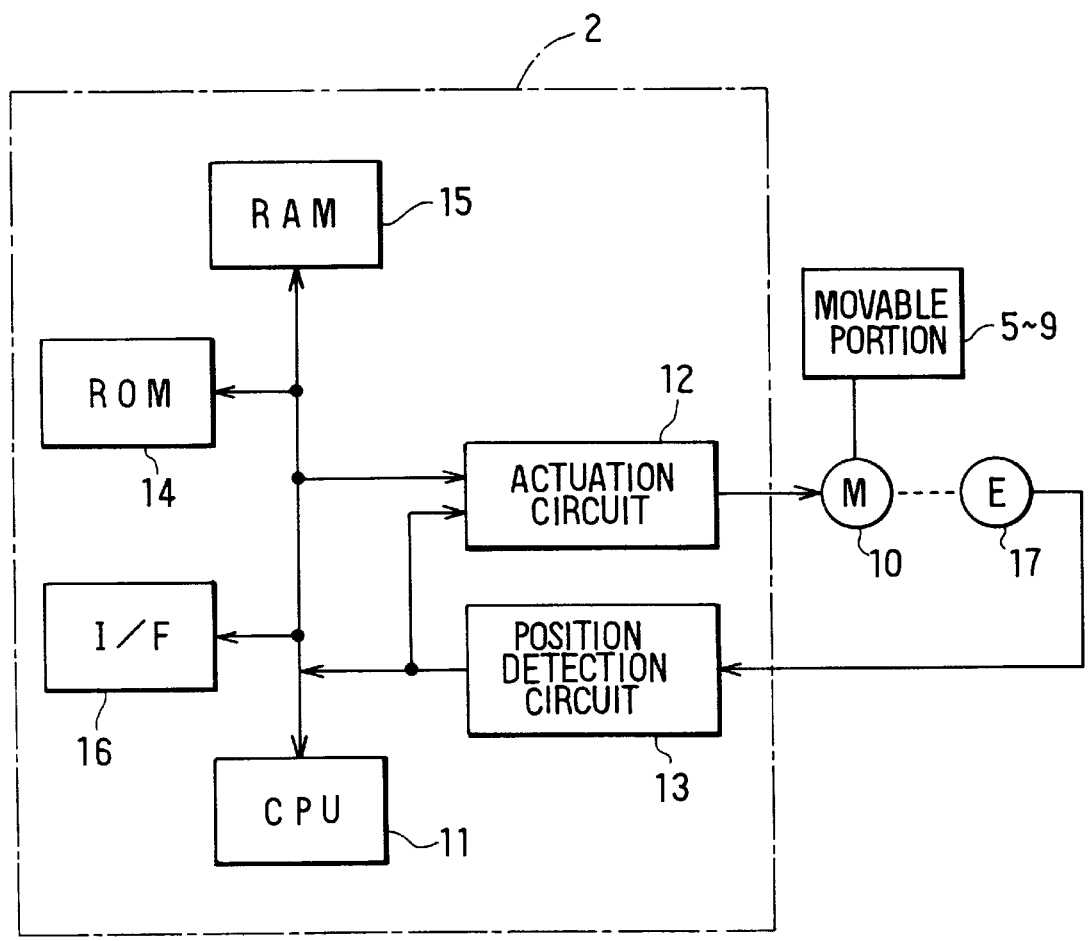
FIG. 2 is a schematic diagrams illustrating electrical component of a control apparatus for the robot.

On the contrary, as shown in FIG. 2, the controller 2 is provided with a CPU 11 as a control portion, an actuation circuit 12 as an actuating means for actuating each of the motor 10 of the joint portion, a detection circuit 13, a ROM having memorized a system program of the whole robot and the like, a RAM having memorized the operation program for the robot main body and the like, and an interface 16 for connecting the teaching pendant 3. Here, FIG. 2 shows the shoulder portion 5, the lower arm 6, the upper arm 7, the wrist 8, and the flange 9 as one block as a movable portion, and consequently it shows only one the motor 10 as the drive unit of the arm. However, the robot system actually includes plural (corresponding to the number of the arms, for example) sets of the movable portion 5–9, the motor 10 and a rotary encoder 17 (described later).

The detection circuit 13 detects a present position (rotation angle) and a present speed (rotation speed) of each of the arm, and is connected with a rotary encoder 17 provided to each of the motor 10 actuating the arm via the joint portions. The rotary encoder 17 is a position sensor also serves as a speed sensor, and outputs pulse signals in accordance with rotation angles of the motor 10. The pulse signals are outputted to the detection circuit 13. The detection circuit 13 detects the present positions of each of the motors 10 and further to the present positions of each of the arms based on the pulse signals from each of the rotary encoders 17. Furthermore, the detection circuit 13 detects the present speeds of each of the motors 10 and further to the present speeds of each of the arms based on the number of the pulse signals from each of the rotary encoders 17 per unit time. The position data and the speed data are outputted to the actuation circuit 12 of the motors 10 and the CPU 11.

The actuation circuits 12 compares a position command value and a speed command value provided from the CPU 11 with the present position and the present speed provided from the detection circuit 13, and provides current in accordance with the difference therebetween to each of the motors 10 to actuate each of the motors 10. In this way, the robot main body is operated so that a central portion of the flange 9 at the tip of the robot traces a locus in accordance with a locus determined by the operation program. Thus, the robot main body assembles plural parts.

Here, the operation program memorizes parameters such as a target position of the tip of the robot, a speed coefficient of each of the motors 10, and an acceleration/deceleration coefficient of each of the motors 10 every one operation. Here, the "speed coefficient" is decided by a ratio of maximum operation speed out of an allowable maximum speed of each of the motor 10, and the "acceleration/deceleration coefficient" is decided by a ratio of acceleration/deceleration out of an allowable maximum acceleration/deceleration of each of the motor 10. The allowable maximum speed and the allowable maximum acceleration/deceleration are decided by taking the transmission mechanism for transmitting the rotation of each of the motor 10 to the arm and a performance of each of the motor 10 into consideration so that a load torque of each of the motor 10 does not exceed, for example, an allowable maximum torque.

The CPU 11 decide the speed pattern from the present portion (operation start point) to the target position (operation end point) of the tip of the robot by adapting, for example, a trapezoid pattern based on parameters memorized in the operation program. After that, the CPU 11 calculates a speed and a position of each of the arm every predetermined time based on the speed pattern to output the actuation circuit 12 as the speed command value and the position command value.

Figure 3A:
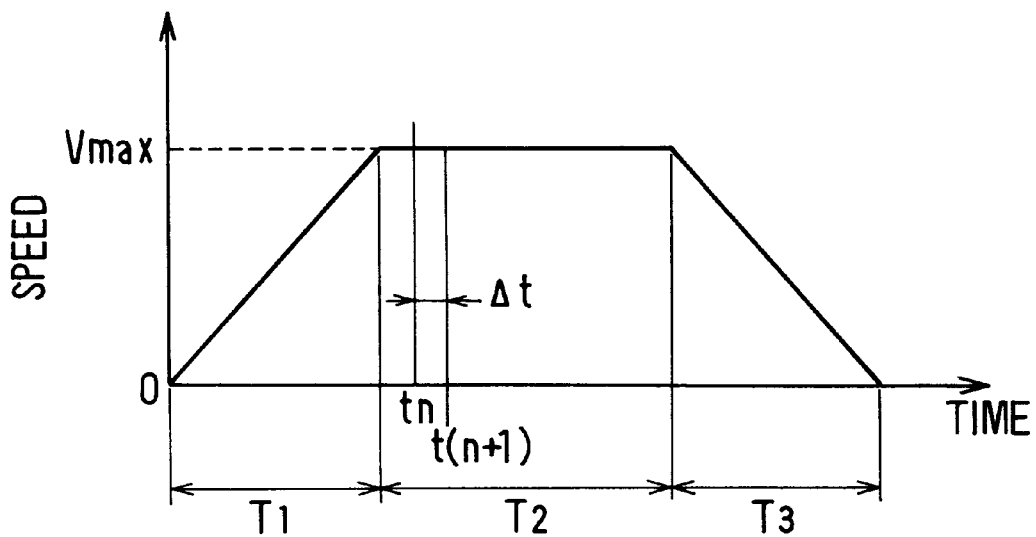
FIG. 3A is a diagram illustrating a speed pattern.
Figure 3B:
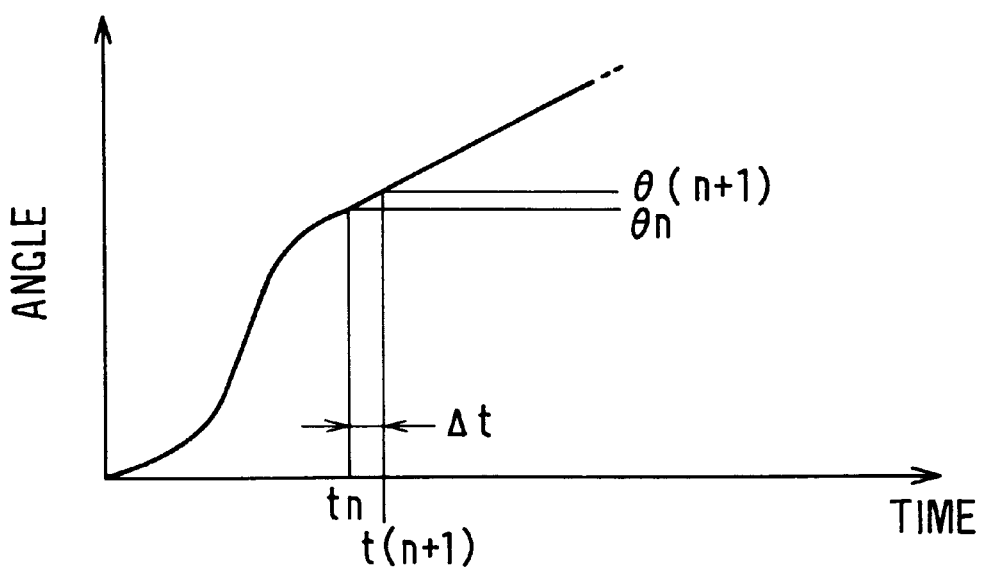
FIG. 3B is a diagram illustrating an operation angle for the speed pattern of FIG. 3A.

In other words, as shown in FIG. 3A, the trapezoid speed pattern has an acceleration stage (T1), a constant speed stage (T2) at the maximum speed, and a deceleration stage (T3). An operation angle (position) pattern to realize this trapezoid speed pattern is shown in FIG. 3B. In this operation angle pattern shown in FIG. 3B, when the angle of the arm at a time of $t_n$ is shown as $\theta_n$ and that at a time of $(t_{n+1})$, which is a time after $\Delta t$ from the $t_n$, is shown as $\theta_{(n+1)}$, changes of the angular at $\Delta t$ corresponds to an angular velocity $V_{(n+1)}$ of the arm at the time of $t_{(n+1)}$. The angular velocity $V_{(n+1)}$ corresponds to the speed command value.

The angle $\theta_{(n+1)}$ of the arm after $\Delta t$ from the $t_n$ is calculated by adding a multiplied value of the angular velocity $V_{(n+1)}$ at the time of $t_{(n+1)}$ by $\Delta t$ to the angle $\theta_n$ at the time of $t_n$ (i.e., $\theta_{(n+1)} = \theta_n + V_{(n+1)} \times \Delta t$). Therefore, the angle every a predetermined sampling time ($\Delta t$) can be sequentially calculated from the operation start point to the operation end point by sequentially calculating the speed every the sampling time ($\Delta t$) from the operation start point based on the speed pattern and sequentially adding the multiplied values of each speed by the sampling time ($\Delta t$).

According to the robot of this embodiment, the tip of the robot is set as scattered points in the operation program, and each of the arms is controlled so that the tip of the robot is moved substantially linearly between each scattered points by using a linear interpolation. When the CPU 11 controls one operation, the CPU 11 decides the speed pattern of the tip of the robot based on the parameters memorized in the operation program, and calculates the speed and a coordinates portion of the tip of the robot at a next sampling time based on the speed pattern every the predetermined sampling time. After that, the CPU 11 calculates the positions of each of the arms at the next sampling time based on the coordinates position of the tip of the robot at the next sampling time, and calculates the speed of each of the arms based on a different between the position of present sampling time and the position of the next sampling time.

In the robot applying the linear interpolation method, it is difficult to predict how each of the arms moves at the time the operation program is made. Therefore, working areas of predetermined arms such as the shoulder portion 5, the lower arm 6, and the upper arm 7 are restricted by both mechanical and software points from a collision prevention point of view.

Figure 4:
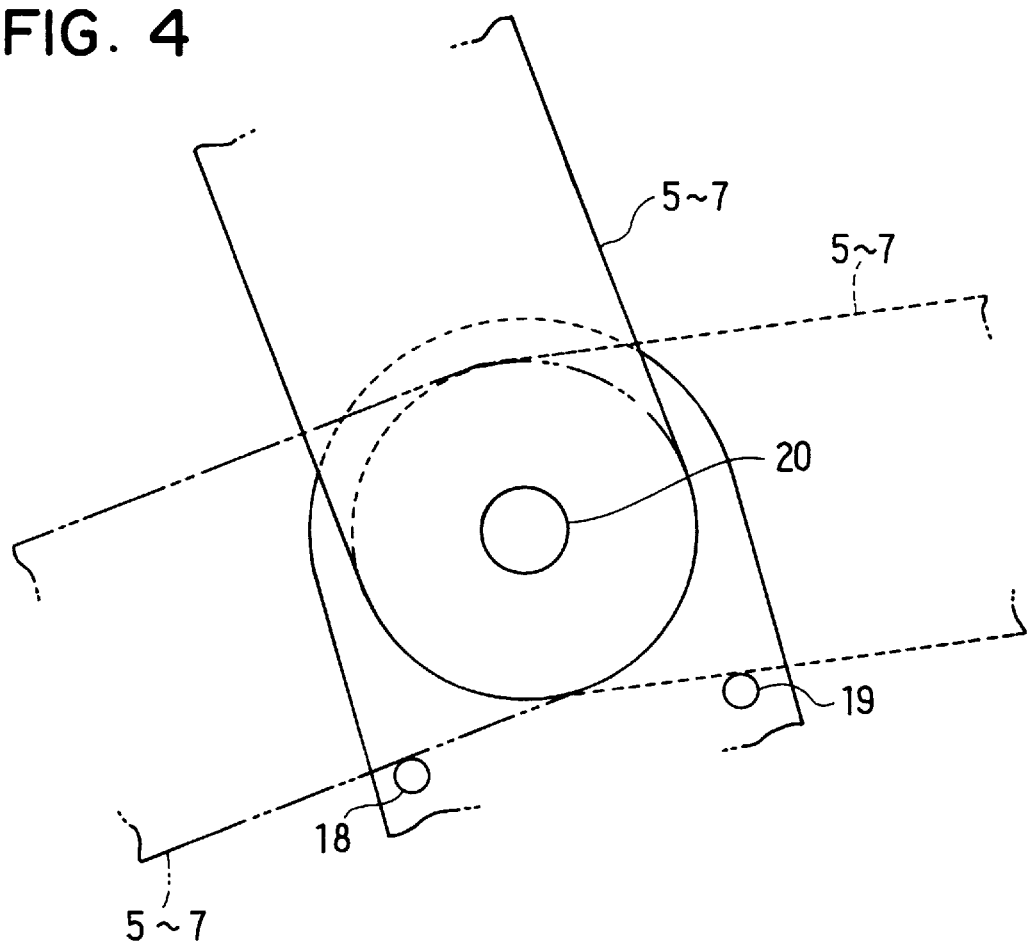
FIG. 4 is a diagram illustrating a restriction of a working area of an arm.

The restriction of working area from the mechanical point is performed by providing stoppers to each of the arms. That is, as shown in FIG. 4, stoppers 18 and 19 are projected from arms, which support each of the arm 5, 6 and 7. That is, stoppers 18 and 19 are provided to the base 4 for the shoulder portion 5, the shoulder portion 5 for the lower arm 6, and the lower arm 6 for the upper arm 7. Each of the arms 5, 6 and 7 is forcedly stopped by colliding with either of the stoppers 18, 19, when each of the arms 5, 6 and 7 is going to rotatably operate exceeding a limit portion defined by the stoppers 18, 19. The positions of the stoppers 18, 19 are set at the limitation positions of the allowable working areas of the arm, and positioned so that the arm lightly touches the either of stoppers 18, 19 when the arm operates to the limit portion (chain line and dashed line in FIG. 4). Here, numeral 20 is a center of rotation of each arm 5, 6 and 7.

The restriction of working area from the software point is performed as follows. Normal working areas are decided within the allowable working areas regarding each reciprocating arm 5, 6 and 7. The CPU 11 detects the speed of the arm in real time, and if the arm exceeds the normal working area when the arm is decelerated with a certain deceleration, the CPU 11 decelerates the arm with the certain deceleration to stop the arm.

In other words, the speeds and the positions of arms 5, 6 and 7 are detected every sampling time. In this embodiment, the sampling time is set to small interval such as 8 milliseconds, and the positions and the speeds of the arms at the next sampling time are obtained every 8 milliseconds. After that, the CPU 11 calculates stop positions of each of the arms 5, 6 and 7 when each of the arms 5, 6 and 7 are decelerated with the predetermined deceleration, and when the calculated stop position exceeds the normal working area, the CPU 11 actually decelerates the arm to stop it by applying brake.

Here, the motor 10 generates a reverse torque so as to perform as a brake means in order to decelerate the arm with the predetermined deceleration. That is, the motor 10 applying brake force to the arm by generating a reverse driving force opposite to the present driving direction. Each deceleration of each arm is individually decided to a predetermined constant value based on the reverse torque generated in the motor 10 and the transmission mechanism for transmitting the rotation of the motor 10 to the arm, and weight of the arm.

In the restriction of the working area of the software, the stop position $P_s$ is calculated as follows. Here, the present speed of the arm is $V_0$, the present position is $P_0$, and deceleration is $\beta$.

At first, a time needed from a start of the deceleration to stop is calculated by the following equation (1).

$$t = V/\beta \tag{1}$$

Operation amount (rotation angle) L from the start of the deceleration to stop is calculated by the following equation (2).

$$L = (\tfrac{1}{2})\beta t^2 \tag{2}$$

Provided that a clockwise direction is plus and a counterclockwise direction is minus regarding the rotation operation of the arm, the stop position $P_s$ is calculated by the following equation (3) when the rotation direction of the arm is the clockwise direction, and is calculated by the following equation (4) when the rotation direction of the arm is the counterclockwise direction.

$$P_s = P_0 + (\tfrac{1}{2})\beta t^2 \tag{3}$$

$$P_s = P_0 - (\tfrac{1}{2})\beta t^2 \tag{4}$$

When the calculated stop position $P_s$ exceeds the predetermined normal working area, it can prevent the arm from operating largely exceeding the normal working area by being applied the brake force to the arm at that time so that the arm can be stopped within the limitation position of the normal working area without fail.

Figure 5:
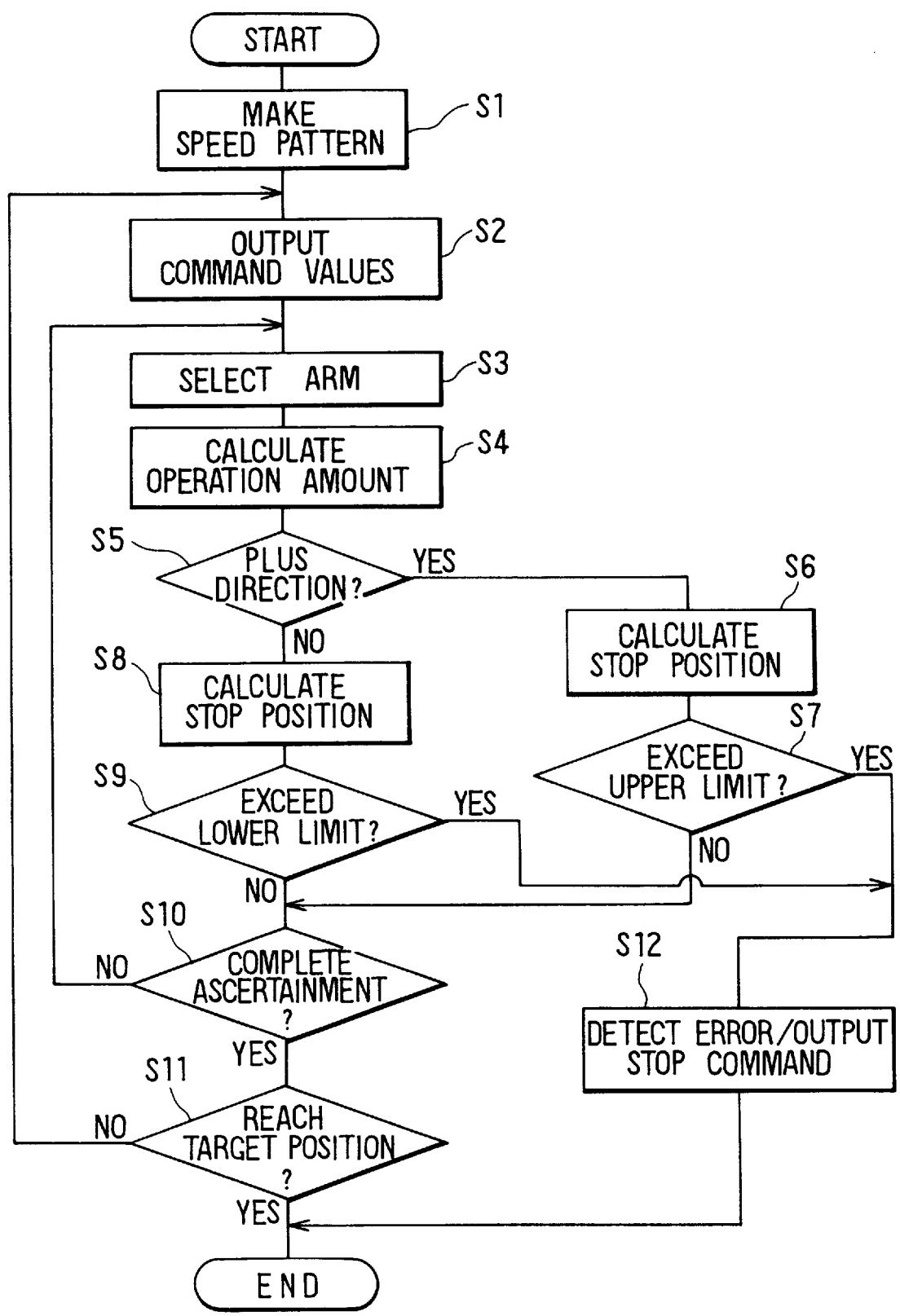
FIG. 5 is a flowchart of a working area ascertainment.

Next, a control flow will be explained with reference to a flowchart shown in FIG. 5.

After the CPU 11 starts the control for one operation, at step S1, the CPU 11 reads parameters such as the coordinates of the target position, speed coefficient, and acceleration/deceleration coefficient from the operation program, and makes the speed pattern based on the parameters (speed pattern making means).

The speed pattern is decided by adapting the trapezoid pattern shown in FIG. 3A based on a travel amount L, an acceleration a, maximum a speed $V_{max}$, a deceleration $\beta$ from a start to an end of the operation. Here, the acceleration α and the deceleration β are calculated by multiplying the allowable maximum acceleration and the allowable maximum deceleration of the motor 10 by the acceleration/deceleration coefficient. Furthermore, the travel amount L is calculated from the target position, which is obtained from the operation program as one of the parameter, and the present position, which is calculated based on position data from the detection circuit 13.

At step S2, after deciding the speed pattern, the CPU 11 calculates the position of the tip of the robot at a time after passing the predetermined time (sampling time; observation time) and calculates the positions of each of the arms based on the position of the tip of the robot every the predetermined time Δt passes. After that, the CPU 11 calculates the position command value and the speed command value of each of the arms as described the above (position obtaining means, speed obtaining means), and outputs these command values to the actuation circuit 12.

At step S3, the CPU 11 selects one of arms in order of a predetermined order out of the arms 5, 6 and 7, whose working areas are to be ascertained.

At step S4, the CPU 11 calculates a stop time t needed from the start of deceleration to stop based on the equation (1) when the arm is decelerated with the deceleration β, and calculates the operation amount (rotation angle) from the start of the deceleration to the stop based on the equation (2). Here, the selected arm is assumed to be operated by the speed command value calculated at step S1.

At step S5, the CPU 11 judges whether the rotation direction is plus direction or not.

When the CPU 11 finds that it is the plus direction ("YES" at step S5), the CPU 11 calculates the stop position of the arm based on the equation (3) at step S6. On the contrary, when the CPU 11 finds that it is the minus direction ("NO" at step S5), the CPU 11 calculates the stop position of the arm based on the equation (4) at step S8.

After that, the CPU 11 judges whether the stop position calculated the above exceeds an upper limitation as a plus side limitation of the normal working area or a lower limitation as a minus side limitation of the normal working area at step S7 or S9 (judging means).

When the CPU 11 finds that the stop position exceeds one of the upper limitation and the lower limitation ("YES" at step S7; or "YES" at step S9), the CPU 11 moves to step 12.

At step S12, the CPU 11 detects errors and actually outputs stop (deceleration) command to the actuation circuits 12 of all arms (stop controlling means), and discontinues the routine.

After each of the actuation circuits 12 receives the stop command, the actuation circuit 12 controls the motor 10 so as to generate predetermined reverse torque. Thus, each of the arms is applied to the brake force to be decelerated with the constant deceleration, and finally it is stopped. In this case, the arm judged to exceed one of the upper limitation and the lower limitation of the normal working area as a result of calculation is decelerated with the deceleration α used in the calculation. Therefore, such the arm is stopped around the limitation point of the normal working area so that it can prevent arm from colliding with the stoppers 18, 19.

On the contrary, when the CPU 11 finds that the stop position does not exceed either of the upper limitation and the lowerlimitation ("NO" at step S7; or "NO" at step S9), the CPU 11 moves to step 10.

At step S10, the CPU 11 judges whether it has completed to ascertain all the arms, which need to be ascertained. When there are any arms having not ascertained ("NO" at step S10), the CPU 11 returns step S2 to ascertain the working area of the not-ascertained arms.

After all the ascertainments of the working areas have completed ("YES" at step S10), the CPU 11 moves to step S11.

At step S11, the CPU 11 judges whether the tip of the robot has reached the target position. When the tip of the robot has not reached the target position ("NO" at step S11), the CPU 11 moves to step S2 so as to continue the steps S2 through S11 till the tip of the robot reaches the target position. That is, the CPU 11 calculates the position of the tip of the robot at the next sampling time, calculates the command speed and the command position of each of the arms, and ascertains the working areas of each of the arms 5, 6 and 7.

According to this embodiment, the arms can be stopped at most positions slightly exceeding the normal working area without fail, because the CPU 11 obtains the operation speed of each of the arms in real time, calculates the stop position if the arm decreases at the predetermined deceleration at that timing, stops the arm by applying the brake force thereto when the stop position is going to exceed the normal working area.

Here, the CPU 11 may increase the brake force (deceleration) applied to the arm to rapidly stop the arm when the present position of the arm approaches the limitation position of the normal working area. In this case, the arm can be stopped within the normal working area so that it can prevent the arm from exceeding the normal working area without fail.

Figure 6:
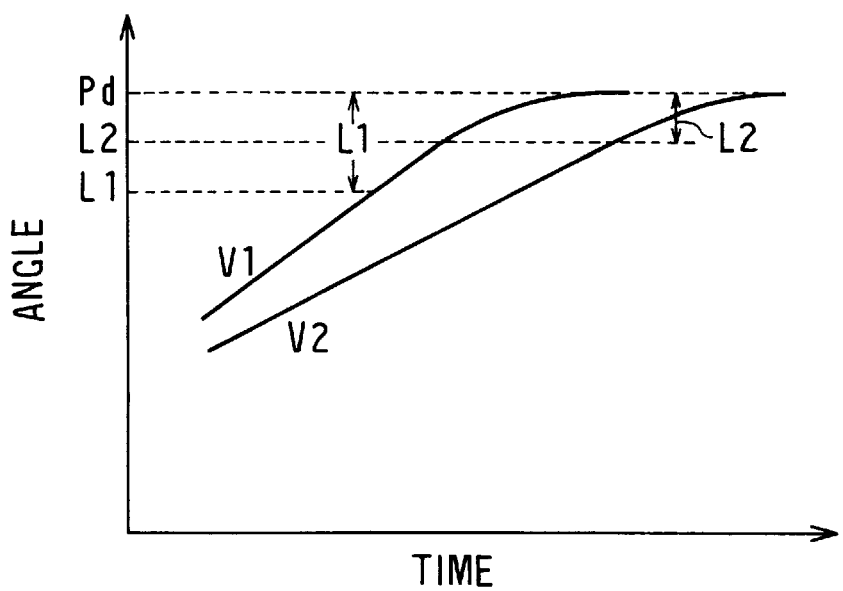
FIG. 6 is a graph illustrating a relationship between an operation speed and a deceleration start position.

The above-mentioned operation will be shown in FIG. 6. When the stop position, which is estimated position the arm stops when the brake force is applied to the arm, is calculated to exceed the limitation position Pd of the normal working area, the brake force is applied to the arm before the limitation position Pd of the normal working area by distance L1 in the case of speed V1, and by distance L2 (L1>L2) in the case of speed V2. After that, when the arm approaches the limitation position Pd, large brake force is applied to the arm to rapidly stop the arm so that the arm is stopped within the normal working area in either case.

The present invention can be modified or expanded as follows without being limited to the above-described embodiments.

The speed V of the arm to be used in the calculation of the operation amount may be the present speed obtained by the detection circuit 13 instead of the speed command value.

The position $P_0$ of the arm to be used in the judgment whether the arm is within the working area or not may be the present position obtained by the detection circuit 13 instead of the position command value.

The decelerations of each of the arms may be changed in real time based on an operation condition such as an operation speed, a load, a position, or an attitude of the robot main body 1.

The present invention may be applied to the other type robot such as a horizontally multi-arm type robot or perpendicular coordinates type robot instead of the perpendicular multi-arm type robot.

What is claimed is:

1. A control apparatus for a robot having an arm, comprising:

position detecting means for detecting a position of an arm every a predetermined observation time;

speed detecting means for detecting an operation speed of the arm every the predetermined observation time;

operation amount calculating means for calculating an operation amount of the arm from a start timing of deceleration to a stop timing of the arm when the arm operating at the operation speed detected by the speed detecting means is decelerated with a predetermined deceleration;

judging means for judging whether a stop position of the arm exceeds a predetermined working area when the arm moves by the operation amount from the position detected by the position detecting means; and stop controlling means for stopping the arm with the predetermined deceleration when the judging means judges that the stop position of the arm exceeds the predetermined working area.

2. A control apparatus according to claim 1, wherein the judging means judges whether the stop position of the arm exceeds the predetermined working area based on the operation amount, the position detected by the position detecting means, and an operation direction of the arm.

3. A control apparatus according to claim 1, wherein:

the robot to be controlled is a multi-arm type robot having a plural of arms, the position detecting means detects each position of each of the arms every the predetermined observation time, the speed detecting means detects each operation speed of each of the arms every the predetermined observation time, the operation amount calculating means calculates each of the operation amounts of each of the arms from the start timing of deceleration to the stop timing of each of the arms when each of the arms operating at each of the operation speeds detected by the speed detecting means is decelerated with the predetermined deceleration, the judging means judges whether the stop position of each of the arms exceeds the predetermined working area when each of the arms moves by the operation amount from the position detected by the position detecting means, and the stop controlling means stops each of the arms with the predetermined deceleration when the judging means judges that the stop position of the arm exceeds the predetermined working area.

4. A control apparatus for a robot having an arm, comprising:

a position detection circuit that detects a position of an arm every a predetermined observation time;

a speed detecting circuit connected to the position detection circuit, that detects an operation speed of the arm every the predetermined observation time;

an operation amount calculating circuit connected to the speed detecting circuit, that calculates an operation amount of the arm from a start timing of deceleration to a stop timing of the arm when the arm operating at the operation speed detected by the speed detecting circuit is decelerated with a predetermined deceleration;

a judging circuit connected to the operation amount calculating circuit, that judges whether a stop position of the arm exceeds a predetermined working area when the arm moves by the operation amount from the position detected by the position detecting circuit; and a stop controlling circuit connected to the judging circuit, that stops the arm with the predetermined deceleration when the judging circuit judges that the stop position of the arm exceeds the predetermined working area.

5. A control apparatus according to claim 4, wherein the judging circuit judges whether the stop position of the arm exceeds the predetermined working area based on the operation amount, the position detected by the position detecting circuit, and an operation direction of the arm.

6. A robot system, comprising:
   a robot main body including:
      a movable portion that rotatably connects arms; and
      a drive unit that rotates the movable portion; and
   a control apparatus including:
      a position detection circuit that detects a position of the arm every a predetermined observation time;
      a speed detecting circuit connected to the position detection circuit, that detects an operation speed of the arm every the predetermined observation time;
      an operation a mount calculating circuit connected to the speed detecting circuit, that calculates an operation amount of the arm from a start timing of deceleration to a stop timing of the arm when the arm operating at the operation speed detected by the speed detecting circuit is decelerated with a predetermined deceleration;
      a judging circuit connected to the operation amount calculating circuit, that judges whether a stop position of the arm exceeds a predetermined working area when the arm moves by the operation amount from the position detected by the position detecting circuit; and
      a stop controlling circuit connected to the judging circuit, that stops the arm with the predetermined deceleration when the judging circuit judges that the stop position of the arm exceeds the predetermined working area.

7. A robot system according to claim 6, wherein the judging circuit judges whether the stop position of the arm exceeds the predetermined working area based on the operation amount, the position detected by the position detecting circuit, and an operation direction of the arm.

8. A robot system according to claim 6, wherein the stop control circuit stops the arm by applying a reverse current to the drive unit against an operation direction of the arm so as to generate a regenerative brake force.

9. A method of controlling a robot having an arm, comprising:
   detecting a position of an arm every a predetermined observation time;
   detecting an operation speed of the arm every the predetermined observation time;
   calculating an operation amount of the arm from a start timing of deceleration to a stop timing of the arm when the arm operating at the detected operation speed is decelerated with a predetermined deceleration;
   judging whether a stop position of the arm exceeds a predetermined working area when the arm moves by the operation amount from the detected position; and
   stopping the arm with the predetermined deceleration when the stop position of the arm is judged to exceed the predetermined working area.

10. A method according to claim 9, wherein the judging step judges whether the stop position of the arm exceeds the predetermined working area based on the operation amount, the detected position, and an operation direction of the arm.

* * * * *